3,013,022
PREPARATION OF OCTAHALO PHTHALANS
Donald D. Phillips, Modesto, Calif., assignor to Shell Oil Company, New York, N.Y., a corporation of Delaware
No Drawing. Filed June 20, 1960, Ser. No. 37,029
3 Claims. (Cl. 260—346.2)

This invention relates to a process for the preparation of octahalo-tetrahydro-methanophthalans. More particularly, it relates to the preparation of 1,3,4,5,6,7,8,8-octahalo-3a,4,7,7a-tetrahydro-4,7-methanophthalans by halogenating a corresponding 4,5,6,7,8,8-hexahalo-3a,4,7,7a-tetrahydro-1,3,-dialkoxy-4,7-methanophthalan.

The octahalo compounds provided by the process of this invention are known insecticides. In the past they have been prepared by chlorinating a corresponding 4,5,6,7,8,8-hexahalo - 3a,4,7,7a-tetrahydro-4,7 - methanophthalan. This phthalan was prepared either by condensing a hexahalocyclopentadiene with 2,5-dihydrofuran or by condensing a hexahalocyclopentadiene with 2-butene-1,4-diol and dehydrating the product.

The present process offers an alternate route to the desired octahalo product. It has the advantage of requiring as starting materials, compounds that may be readily prepared from commonly available, inexpensive reagents as opposed to the dihydrofuran or butenediol of the prior art. Thus, the 1,3-dialkoxy-hexahalophthalans of the present process may be prepared from furan in a straightforward 2-step synthesis. For example, the furan may be reacted by known methods with an alkanol in the presence of chlorine and sodium carbonate to give a 2,5-dialkoxyfuran. This product then may be condensed in the manner of the Diels-Alder diene synthesis with a hexahalocyclopentadiene to give the starting compounds for the present invention.

According to the present invention, a process is provided for the preparation of octahalophthalans which comprises halogenating 1,3-dialkoxy - 4,5,6,7,8,8-hexahalo-3a,4,7,7a-tetrahydro-4-7-methanophthalan.

The fact that the present process produces the octahalo product that has been obtained is quite surprising. The expected reaction may be shown as

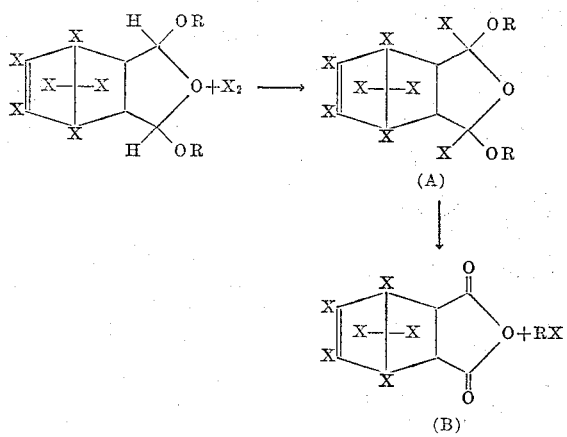

(A)

↓

(B)

where X is a halogen atom and R is an alkyl radical. The anhydride (B) was to be most expected or, less likely, the unstable precursor (A). Thus, the hydrogen atoms alpha to an alkoxy group and the phthalan oxygen atom are the most acidic ones in the starting compound; from the known reactions of other acetal-type compounds with halogen, it was expected that chlorine would abstract these hydrogen atoms to produce (A) or (B). However, neither (A) nor (B) is found in the reaction mixture. Instead, the product actually produced may be represented by the formula

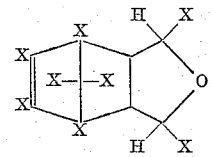

where X is a halogen atom.

The starting materials suitable for use in the present invention include all of the halo-substituted compounds. However, the middle halogen-substituted, i.e., bromine- or chlorine-substituted, 1,3-dialkoxy-4,5,6,7,8,8-hexahalo-3a,4,7,7a-tetrahydro-4,7-methanophthalans are preferred. Of these, chlorine-substituted compounds are most preferred.

The alkoxy groups may be those having straight, branched, or cyclic alkyl portions and each may contain up to 18 or more carbon atoms. The alkoxy-substituted compounds containing straight-and branched-chain alkyl groups of no more than 12 carbon atoms are preferred.

Examples of suitable starting materials for this invention include among others the following specific examples:
1,3 - dimethoxy-4,5,6,7,8,8-hexachloro-3a,4,7,7a - tetrahydro-4,7-methanophthalan; 1,3-diethoxy-4,5,6,7,8,8-hexachloro-3a,4,7,7a - tetrahydro-4,7 - methanophthalan; 1,3-dipropoxy - 4,5,6,7,8,8-hexachloro-3a,4,7,7a - tetrahydro-4,7 - methanophthalan; 1,3-diisopropoxy-4,5,6,7,8,8-hexachloro - 3a,4,7,7a - tetrahydro-4,7-methanophthalan; 1,3-dibutoxy - 4,5,6,7,8,8-hexabromo-3a,4,7,7a - tetrahydro-4,7 - methanophthalan; 1,3-dicyclohexyloxy - 4,5,6,7,8,8-hexabromo - 3a,4,7,7a-tetrahydro-4,7 - methanophthalan; 1,3-dioctyloxy - 4,5,6,7,8,8-hexabromo-3a,4,7,7a-tetrahydro-4,7 - methanophthalan; and 1,3-didodecyloxy-4,5,6,7,8,8-hexachloro-3a,4,7,7a-tetrahydro-4,7-methanophthalan.

The halogenating agent should be one that contains a halogen corresponding to the halogen substiutents already on the polycyclic ring. Examples of suitable halogenating agents are molecular halogens, sulfuryl halides such as sulfuryl chloride and sulfuryl bromide, phosphorus pentahalides such as phosphorus pentachloride, and the like. Molecular halogens have been found to be very suitable. Chlorine is therefore the most preferred halogenating agent.

The reaction is generally carried out in any convenient phase and at a temperature and pressure that results in appreciable product formation.

Liquid phase is generally most convenient for gaining maximum contact between the halogenating agent and the starting compound and is preferred.

Pressures may be varied over a considerable range to include both super- and subatmospheric pressures. Atmospheric pressure is preferred for convenience.

Temperatures may be correspondingly varied over a considerable range. At atmospheric pressure, it has been found that the reaction proceeds smoothly upon heating the reaction mixture to temperatures between about 50° C. and 200° C., preferably between about 50° C. and 100° C.

A convenient method of conducting the process of the invention involves treating a solution of the selected hexahalo-tetrahydromethanophthalan in an inert solvent with molecular halogen (which may be introduced undiluted into the solution or added in the form of a previously prepared solution of the halogen in the same or a different solvent) until the desired uptake of halogen has been achieved. The solvent, or diluent, may be one, for example, with a boiling point that is suitable as the reaction temperature, in which case the halogenation may be carried out with refluxing of the solvent or diluent to aid regulation of the temperature.

Halogenated saturated hydrocarbons are particularly suitable solvents. Carbon tetrachloride is especially well suited to the process of this invention since it is inert under the reaction conditions and boils in the preferred temperature range at atmospheric pressure. It is therefore preferred to carry out the reaction in carbon tetrachloride. Other suitable solvents that may be used include dibromomethane, dichloroethane, dibromopropane, tetrachloroethane, and the like.

Particularly in the case of chlorination, it has been found that irradiation of the reaction mixture during halogenation will accelerate the reaction and improve the yield. Although this too is not required, it is nevertheless preferred to irradiate the reactants during the course of the reaction with ultraviolet light.

When the halogenation reaction has gone to completion, the desired product is recovered from the reaction mixture and purified by any known suitable methods. For example, filtration and recrystallization of the product will result in crystals having a suitable degree of purity.

The details of the process of this invention are best described by reference to the following example. It is to be understood that the example is offered for illustrative purposes only and is not to be construed as limiting the invention in any respect.

*Example*

A solution containing 18.5 grams (0.46 mole) of 1,3-dimethoxy - 4,5,6,7,8,8 - hexachloro-3a,4,7,7a-tetrahydro-4,7-dimethanophthalan (M.P. 168–170° C.) in 200 ml of carbon tetrachloride was heated under reflux and irradiated while chlorine was bubbled in. The uptake was very rapid and after 10 minutes the yellow color of excess chlorine persisted. The carbon tetrachloride was evaporated and the solid residue crystallized from isopropyl alcohol to afford 13 grams of crystals melting at 122–124°C. A second crop of 3.5 grams, M.P. 119–123°C. was obtained from the filtrate for a total yield of 16.5 grams, or 88% yield.

Infrared examination indicated that the crystals were identical to a known sample of 1,3,4,5,6,7,8,8-octachloro-3a,4,7,7a-tetrahydro-4,7-methanophthalan.

I claim as my invention:

1. A process for the preparation of 1,3,4,5,6,7,8,8-octachloro - 3a,4,7,7a-tetrahydro-4,7 - methanophthalan which comprises chlorinating 1,3 - dialkoxy-4,5,6,7,8,8-hexachloro - 3a,4,7,7a-tetrahydro-4,7 - methanophthalan, wherein the alkyl portions of the 1,3-dialkoxy groups are alkyl groups of up to 18 carbon atoms, with molecular chlorine.

2. A process for the preparation of 1,3,4,5,6,7,8,8-octachloro - 3a,4,7,7a-tetrahydro-4,7 - methanophthalan which comprises chlorinating 1,3-dimethoxy-4,5,6,7,8,8-hexachloro - 3a,4,7,7a-tetrahydro-4,7 - methanophthalan with molecular chlorine.

3. A process for the preparation of 1,3,4,5,6,7,8,8-octachloro - 3a,4,7,7a-tetrahydro-4,7 - methanophthalan which comprises chlorinating 1,3-dialkoxy-4,5,6,7,8,8-hexachloro - 3a,4,7,7a-tetrahydro-4,7 - methanophthalan, wherein the alkyl portions of the 1,3-dialkoxy groups are alkyl groups of up to 18 carbon atoms, with molecular chlorine, in liquid phase in solution in an inert halogenated saturated hydrocarbon solvent while heating and irradiating said liquid phase.

References Cited in the file of this patent

Fieser: Organic Chemistry (Third Edition, 1956).